US006145352A

United States Patent [19]

Vickers et al.

[11] Patent Number: 6,145,352

[45] **Date of Patent: *Nov. 14, 2000**

[54] SLAM LATCH WITH OPPOSING SLIDES

[75] Inventors: James H. Vickers, Middletown Township, Delaware County; Stefan M. Koveal, Glen Mills, both of Pa.

[73] Assignee: Southco, Inc., Concordville, Pa.

[ * ] Notice: This patent is subject to a terminal disclaimer.

[21] Appl. No.: 09/383,854

[22] Filed: Aug. 26, 1999

Related U.S. Application Data

[63] Continuation of application No. 09/016,523, Jan. 30, 1998.

[51] Int. Cl.[7] ...................................................... B60R 25/02

[52] U.S. Cl. ....................................... 70/208; 292/DIG. 31

[58] Field of Search ............... 70/71, 208; 292/DIG. 31, 292/38, 336.3, 170, 173, 224, 252

[56] References Cited

U.S. PATENT DOCUMENTS

| | | | |
|---|---|---|---|
| 2,148,050 | 2/1939 | Moseley | 292/1 |
| 3,136,148 | 6/1964 | Nehls | 70/169 |
| 4,231,597 | 11/1980 | Pelcin | 70/208 X |
| 4,683,736 | 8/1987 | Weinerman et al. | 70/208 |
| 4,841,755 | 6/1989 | Weinerman et al. | 70/208 |
| 4,951,486 | 8/1990 | Braun et al. | 70/208 |
| 5,088,777 | 2/1992 | Ono | 292/40 |
| 5,413,391 | 5/1995 | Clavin et al. | 292/170 |
| 5,595,076 | 1/1997 | Weinerman et al. | 70/208 |
| 5,689,980 | 11/1997 | Weinerman et al. | 70/208 |
| 5,820,174 | 10/1998 | Parikh et al. | 70/208 X |
| 5,820,175 | 10/1998 | Clavin | 292/DIG. 31 X |
| 5,878,608 | 3/1999 | Alyanakian | 70/208 |

*Primary Examiner*—Suzanne Dino Barrett
*Attorney, Agent, or Firm*—Paul & Paul

[57] ABSTRACT

A lever-action slam latch includes a pair of opposing, nested slides so that a single latch can be mounted in either left-handed or right-handed door. The locking mechanism is difficult to circumvent, and permits the key to remain in the lock while the latch is opened.

18 Claims, 5 Drawing Sheets

FIG. 6
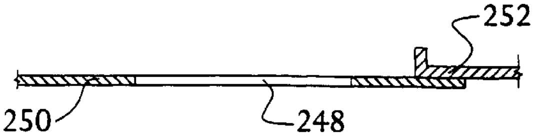
FIG. 5
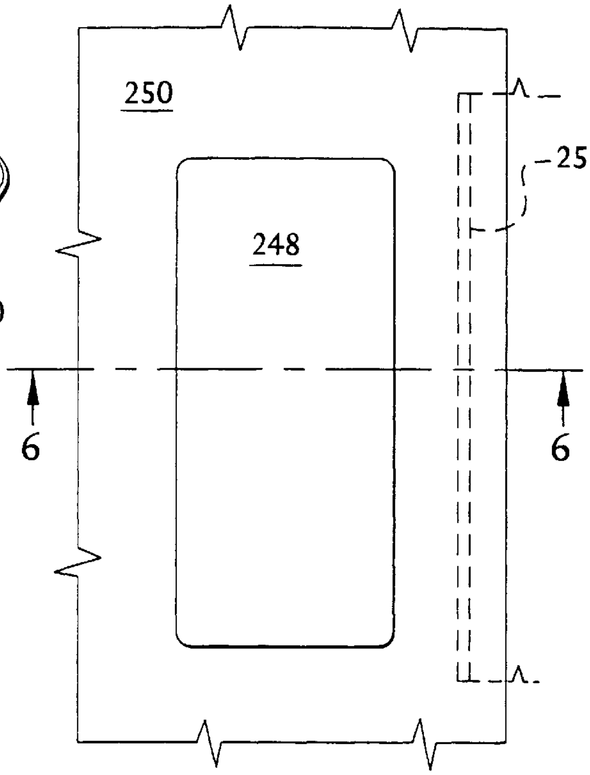
FIG. 1
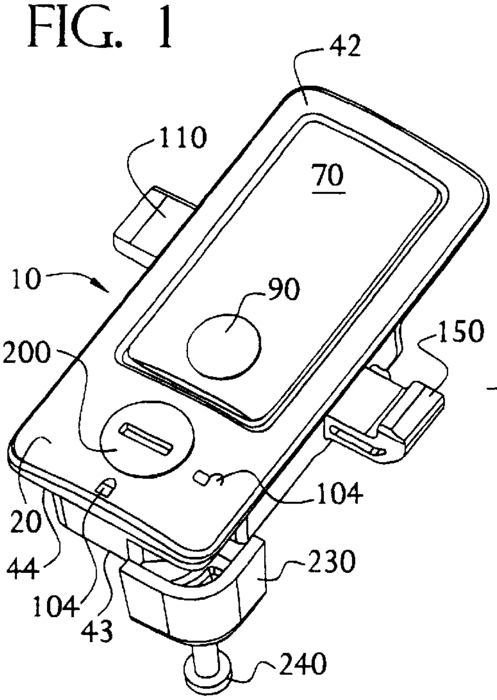
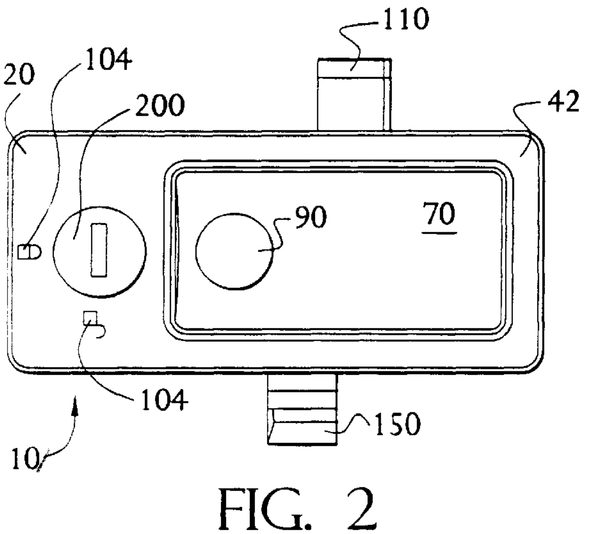
FIG. 2
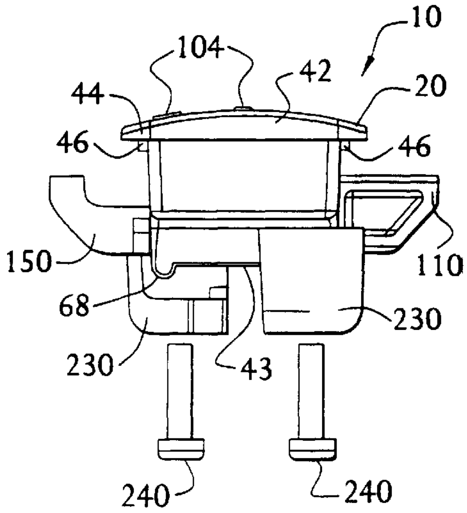
FIG. 3

FIG. 16
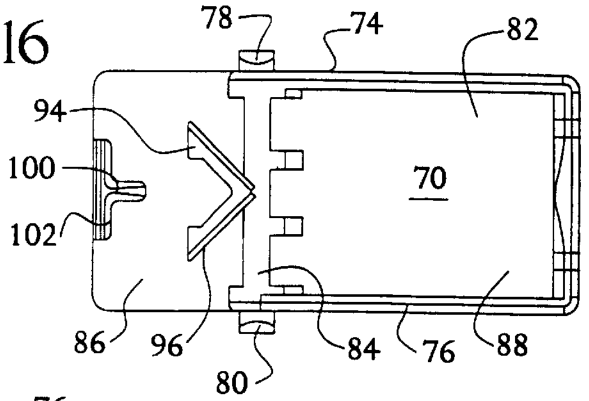
FIG. 17
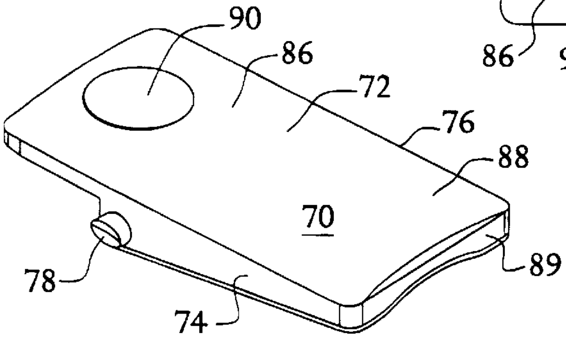
FIG. 14
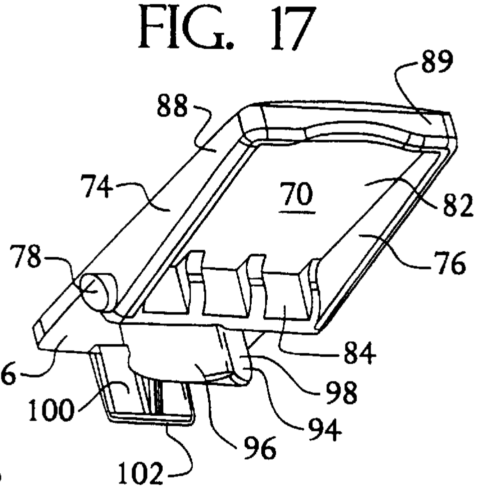
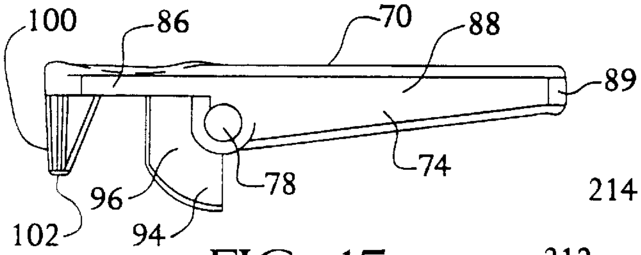
FIG. 15
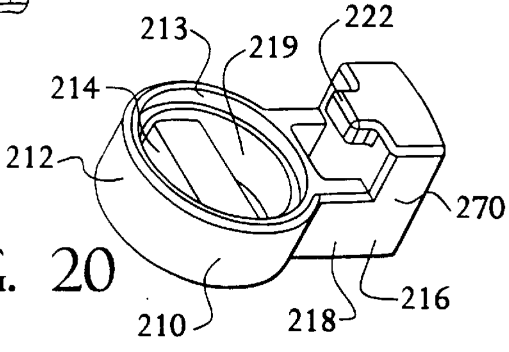
FIG. 20
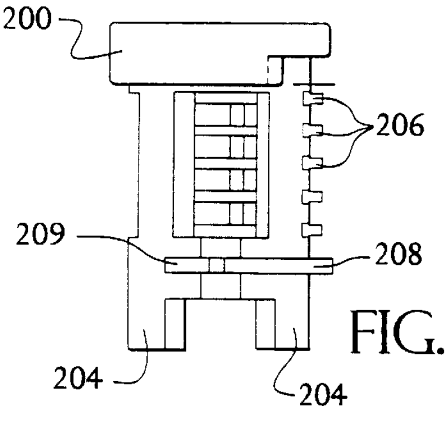
FIG. 18
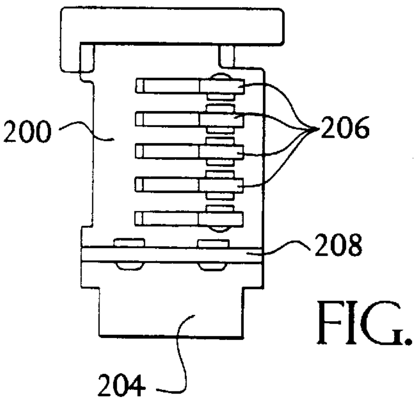
FIG. 19

SLAM LATCH WITH OPPOSING SLIDES

CROSS-REFERENCE TO RELATED APPLICATION

This a continuation of co-pending Ser. No. 09/016,523 filed Jan. 30, 1998 entitled "Slam Latch With Opposing Slides."

BACKGROUND OF THE INVENTION

1. Field of the Invention

The present invention relates generally to latching devices, and more particularly to systems for latching hinged doors or panels and the like.

2. Background of the Invention

Various types of latching devices for fastening doors, panels and the like are known. Often the latching device is mounted in the door or panel near the edge so that the panel frame can be engaged to secure the panel.

Door-mounted "slam" latches employ a camming surface on the end of a sliding-bolt element which cooperates with a striker on the door frame or the frame itself to cause a bolt action to secure the door when it is closed against the frame. Such latches are activated to secure the door when the door is merely pushed shut or slammed. However, operation of the latch mechanism is required to release the latch to open the door. In some slam latches, the bolt is urged against a spring force by the action of a camming surface cooperating with the striker to slide into the latch housing as the door is being closed. The spring force then urges the bolt element to engage behind the door frame or to engage a keeper mounted on the door frame. In order to open the door, the bolt is manually operated to withdraw the bolt from engagement with the keeper so that the door can be swung open.

A prior art, flush-mounted slam latch includes a lockable metal lever or "paddle" for operating a latching pawl. The pivot-mounted lever moves in a plane perpendicular to the axis in which the latching pawl travels, and the lever and the latching pawl each include angled camming surfaces to transform the motion of the lever into the perpendicular travel of the latching pawl. Symmetric camming surfaces are provided on the latching pawl and the lever so that the latching pawl can be installed for either left side or right side operation. The key slot for the lock is located in through a hole in the lever so that the key used to unlock this latch must be removed from the lock cylinder in order for the lever to be lifted. The slam latch is operated by first pushing down the lever on one side of the pivot, and subsequently grasping the lever end extending above the surface of the panel on the other side of the pivot. Locking is accomplished through a thin metal ring mounted on the lock cylinder proximate the underside of the lever for rotation with the cylinder. A tab on the metal ring is adapted to engage a small bracket molded into the underside of the lever when the lock cylinder is in a "locked" position.

While such prior art latches can be adapted for use on either "left-handed" or "right-handed" panel doors, that is, panel doors which are hinged on either the right or left sides, there is a need for a slam latch which can be used on either type of door without modification. Further, there is a need for a lockable, flush-mounted slam latch which can be unlatched without removing the key after unlocking. There is also a need for a lockable, flush-mounted slam latch resistant to being "forced" by thieves or vandals. In addition, there is a need for a light weight, corrosion-resistant slam latch which can be used in adverse environments.

SUMMARY OF THE INVENTION

The present invention provides a lockable, flush-mounted slam latch which can be adapted for use on either "left-handed" or "right-handed" panel doors without modification. The present invention also provides a lockable, flush-mounted slam latch which can be unlatched without removing the key after unlocking the latch. The present invention further provides a lockable, flush-mounted slam latch resistant to be opened by unauthorized individuals. The present invention provides a light weight, corrosion resistant slam latch which can be used in adverse environments, and is inexpensive to manufacture.

The present invention provides a latch of the sliding-action slam type for installation in an opening in a door panel for releasably retaining the door panel relative to a frame. The latch includes a latch body having a pair of opposed apertures and a handle rotatably mounted on the latch body. The opposed apertures, preferably formed in opposite sides of the latch body, are preferably sized to fit a pair of latch bolts. The handle has a first camming surface as well as a second camming surface, for displacing the latch bolts. The latch handle is rotatable between a closed position, in which it is flush with the top of the latch body, and an open position, in which one end of the handle protrudes from the latch body.

The latch includes first and second slide bolts. Preferably, the two slide bolts are nested to support each other. These first and second slide bolts are mounted in the latch body for travel through the opposed apertures. Each of the first and second slide bolt has a camming surface for engagement with a respective camming surface of the handle.

The handle and the two slide bolts are mounted in the latch body such that, when the handle is rotated from the closed position to the open position, the first slide bolt is cammed inwardly by the first camming surface of the handle through one of the opposed apertures in the latch body. At the same time, the second slide bolt is being cammed, by the second camming surface of the handle, inwardly through the other of the opposed apertures in the latch body.

Preferably, the slam latch also includes spring means for biasing the first slide bolt and the second slide bolt outwards. Thus, when the slide bolts are being cammed inward by the upward rotation of the handle, the spring means is being compressed. When the slide bolts have been retracted sufficiently so that the latch no longer engages the door frame, the door can be opened by pulling outward on the handle. Once the door is open, the operator can release the handle. When this occurs, the compressed spring means urges the slide bolts outward, and through the camming surfaces, the handle inwards. When the door is shut contact with the door frame urges one of the bolts inward, permitting the bolt to pass behind the frame, where the spring means again urges it outwards to latch the door.

Preferably, the slide bolts are configured to nest and support each other as they retract and expand. This is preferably accomplished by several sets of tabs and recesses formed in corresponding surfaces of the respective slide bolts to provide guide surfaces for motion of the slide bolts with respect to each other.

Preferably, both the first slide bolt and the second slide bolt each have an inner side and an outer side, the slide bolts being mounted in the latch body such that the inner side of the first slide bolt is adjacent the inner side of the second slide bolt.

The first set of tabs and recesses are symmetric, in that each of the slide bolts is preferably provided with an identical tab and recess. Preferably, the first slide bolt includes a first tab protruding from the inner side and has a first guide surface formed at its outer end thereof, while the second slide bolt includes a first recess formed in the inner side and has a first guide surface formed in the recess. The first tab of the first slide bolt and the first recess of the second slide bolt are arranged so that the first guide surface of the first slide bolt lies adjacent the first guide surface of the second slide bolt. The first tab of the first slide bolt travels along the first recess of the second slide bolt when the two slide bolts move with respect to one another.

It is also preferred that the second slide bolt also include a first tab protruding from its inner side. This first tab has a second guide surface formed at its outer end. Similarly, the first bolt preferably also includes a first recess formed in its inner side and this recess has second guide surface formed therein. Also similarly, the first tab of the second slide bolt and the first recess of the first slide bolt are arranged so that the second guide surface of the second slide bolt lies adjacent the second guide surface of the first slide bolt, and the first tab of the second slide bolt travels along the first recess of the first slide bolt when the two slide bolts move with respect to one another.

Preferably, the first recess and first tab of the first slide bolt and the first recess and first tab of the second slide bolt define a chamber. In this chamber, the spring means is preferably mounted between the first slide bolt and the second slide bolt.

The second set of tabs and recesses are not symmetric. Preferably, the first slide bolt include a second tab extending from the inner side of the first slide bolt and have a third guide surface formed by one side of the second tab. In addition, it is preferred that the second slide bolt have a second recess formed in the top thereof for receiving this second tab of the first slide bolt. Preferably, the second slide bolt has a third guide surface formed in the second recess, such that the third guide surface of the first slide bolt lies adjacent the third guide surface of the second slide bolt. Preferably, the camming surface of the first slide bolt is formed on the second tab, and the camming surface of the second slide bolt is formed adjacent the second recess of the second slide bolt. When the handle is moved from a latched or closed position to an unlatched or open position, the first and second camming surfaces of the handle respectively contact the camming surface of the first slide bolt formed on the second tab, and the camming surface of the second slide bolt formed adjacent the second recess, to move the slide bolts with respect to each other and retract them.

The third set of tabs and recesses is also not symmetric. Preferably, the first slide bolt also includes a second recess formed in the inner side thereof and having a fourth guide surface formed in the second recess. In addition, it is preferred that the second slide bolt have a second tab formed on its inner side and fourth guide surface formed at the end thereof. Preferably, the second recess of the first slide bolt and the second tab of the second slide bolt are adapted such that the fourth guide surface of the first slide bolt lies adjacent the fourth guide surface of the second slide bolt. The second tab of the second slide bolt preferably travels along the second recess of the first slide bolt when the slide bolts move with respect to one another, thereby providing additional support.

In another aspect, the present invention also provides a slam action latch including a latch body; at least one slide bolt, a handle rotatably mounted on the latch body for actuating the at least one slide bolt and rotatable between a closed position and an open position, a lock cylinder adapted for rotation between a locked position and an unlocked position, and a lock actuator mounted for rotation with the lock cylinder. The lock actuator is adapted to prevent rotation of the handle when the lock is in the closed position, thus providing enhanced security, and making the latch difficult to unlatch when locked. Preferably, the handle has a first end and a second end and an intermediate pivot axis, and is adapted to rotate from a closed position to an open position by being pressed intermediate the first end and the pivot axis. Preferably, the lock actuator includes an arm that rotates as the lock cylinder is rotated between an open position and a closed position. Preferably, the arm is positioned beneath the handle intermediate the first end and the pivot axis when the lock cylinder in the closed position, thereby preventing rotation of the handle.

BRIEF DESCRIPTION Of THE DRAWINGS

FIG. 1 is a perspective view of the slam latch of the present invention.

FIG. 2 is a top plan view of the slam latch of FIG. 1.

FIG. 3 is a rear elevational view of the slam latch of FIG. 1.

FIG. 5 is a fragmentary plan view of a cabinet having a panel door adapted for installation of the slam latch of FIG. 1.

FIG. 6 is a fragmentary sectional view of the cabinet of FIG. 5 taken along the line 6—6.

FIG. 14 is a perspective view of the handle of the slam latch of FIG. 1 as seen from above.

FIG. 15 is a side elevational view of the handle of FIG. 14.

FIG. 16 is a bottom plan view of the handle of FIG. 14.

FIG. 17 is a second perspective view of the handle of FIG. 14 showing the handle as seen from below.

FIG. 18 is a front elevational view of the lock cylinder of the slam latch of FIG. 1.

FIG. 19 is a side elevational view of the lock cylinder of FIG. 18.

FIG. 20 is a perspective view of the lock actuator of the slam latch of FIG. 1.

DETAILED DESCRIPTION

Figure 4:
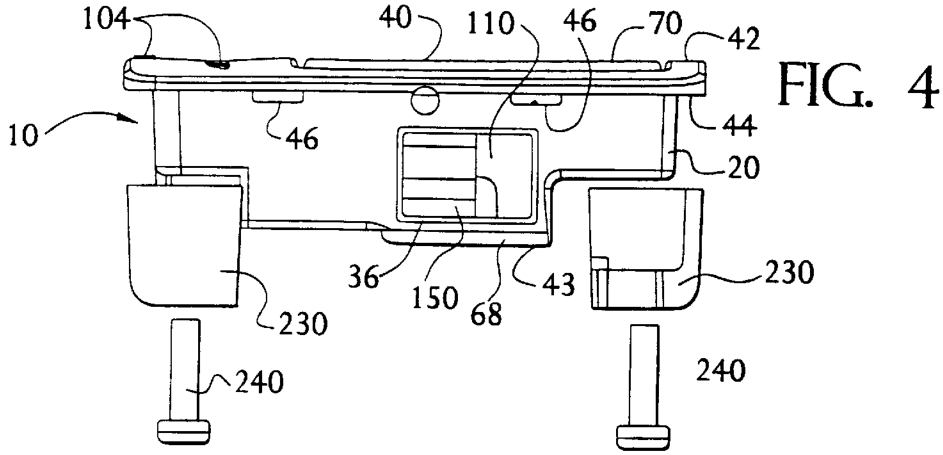
FIG. 4 is a left side elevational view of the slam latch of FIG. 1.

Referring now to the drawings in detail, wherein like reference numerals indicate like elements throughout the several views, there is shown in FIG. 1 a perspective view of a slam latch 10 of the present invention adapted (a) to be mounted in a sized aperture 248 (FIGS. 5 and 6) on a door panel 250 and (b) to secure the door panel 250 to a frame 252, the door panel 250 and frame 252 comprising a cabinet 254.

Figure 23:
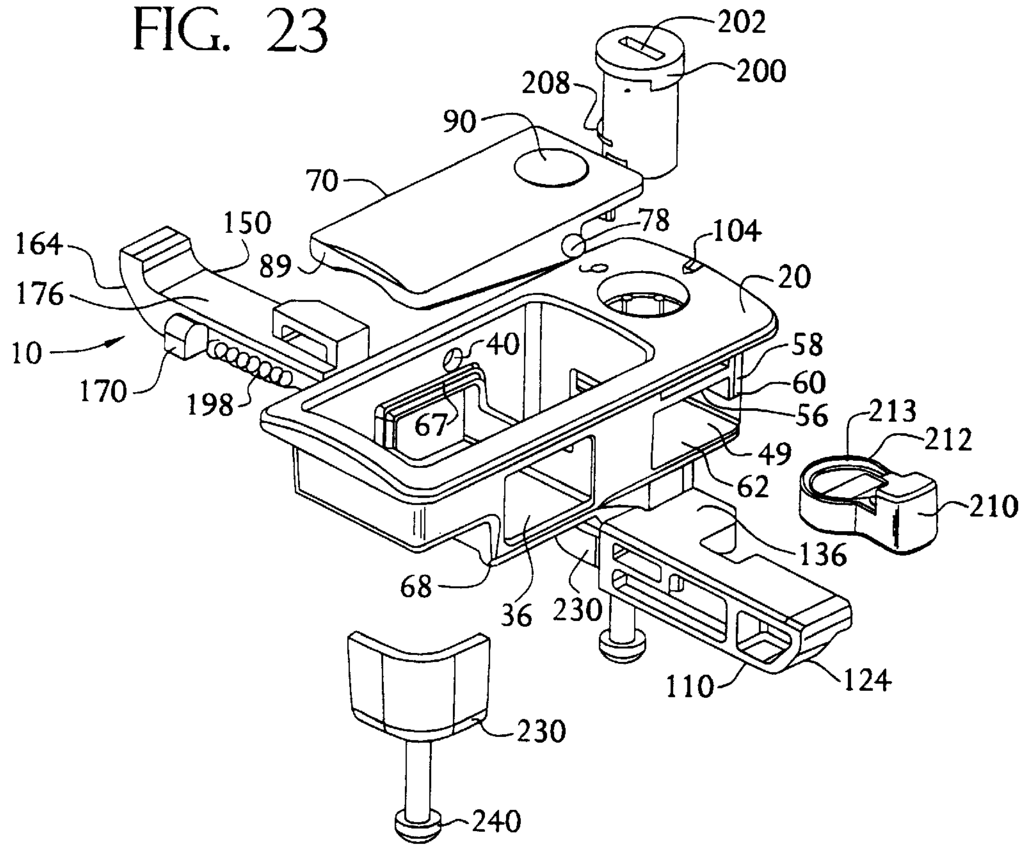
FIG. 23 is an exploded perspective view of the slam latch of FIG. 1.

The slam latch 10 includes a latch body or housing 20, preferably formed as a single component by a molding process from a thermoplastic polymeric material. As best seen in the rear end elevational view of FIG. 3, the generally rectangular top 42 of the latch body 20 is slightly arched upwardly for aesthetic reasons. As best seen in the perspective views of FIGS. 7 and 8, the latch body 20 includes a generally rectangular well or chamber 22, in which a latch handle or paddle 70 (FIGS. 1, 2, 14–17) is mounted. As can be seen in the perspective view of FIG. 1, also mounted in the well 22 of the latch body 20 are a first slide bolt 110 and a second slide bolt 150, and a spring means 198 (FIG. 10) for biasing the slide bolts 110, 150 outwards. The slam latch 10 also includes a conventional lock cylinder 200 (FIG. 1) for locking the latch 10, and indicia 104 are provided on the top 42 of the latch body 20 to indicate whether the lock cylinder 200 is locked or unlocked. An actuator 210, shown in FIGS. 20 and 23, is rotated when the lock cylinder 200 is locked or unlocked. The actuator 210 prevents the handle 70 from being operated when the lock cylinder 200 is locked. As shown in FIG. 3, the top 42 of the latch body 20 also includes a peripheral flange 44 and a plurality of spacer tabs 46 under the flange 44 for mounting and positioning the slam latch 10 in the sized aperture 248 (FIG. 5) in the door panel 250. The slam latch 10 is secured by a pair of mounting clips 230 (FIG. 1) affixed with screws. Except for the spring means 198, the lock cylinder 200 and the screws 240, which are preferably formed from metal, all other parts are preferably formed by molding a thermoplastic polymeric material. In particular, the latch body 20 and handle 70 are preferably formed from blend of polycarbonate and ABS copolymer, so as to provide a smooth, attractive surface texture which simultaneously provides a toughened, stress-resistant part. The slide bolts 110, 150 are preferably formed from a glass-reinforced nylon to provide a strong part with a low friction coefficient.

Figure 7:
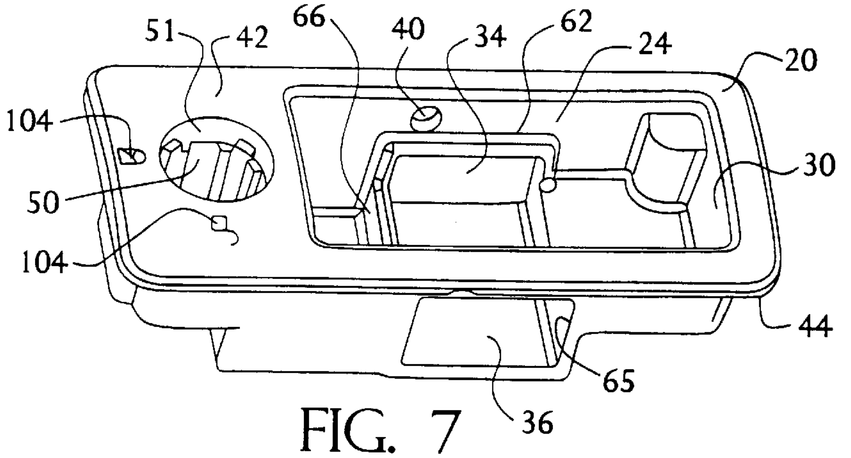
FIG. 7 is a perspective view of the latch body or housing of the slam latch of FIG. 1 as seen m the left side of the latch body.
Figure 8:
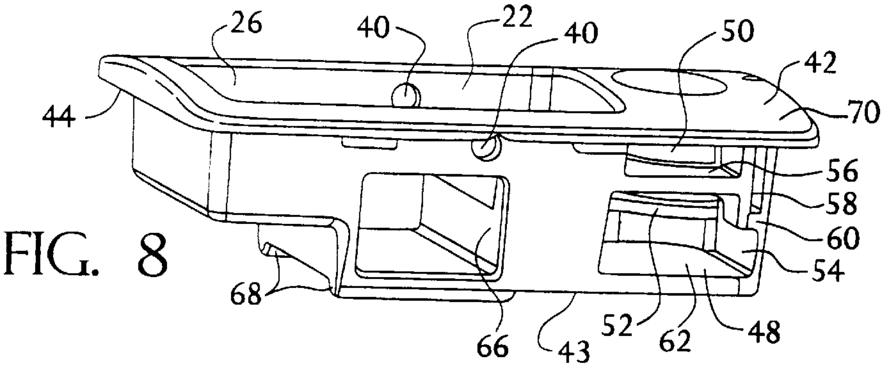
FIG. 8 is a second perspective view of the latch body of FIG. 7 as seen from the right side of the latch body.

As best seen in FIGS. 7 and 8, the well 22 of the latch body 20 includes a first side wall 24 and a second side wall 26, as well as a front end wall 28, a rear end wall 30, and a bottom 32. A generally rectangular first aperture 34 is formed in the first side wall 22; and a generally rectangular second aperture 36 is formed in the second side wall 26. The first and second apertures 34, 36 are opposed, lying on a common axis perpendicular to the length of the latch body 20, and adapted to receive the first and second slide bolts 110, 150, such as shown in the side elevational view of FIG. 4. As shown in FIG. 7, the bottom 32 of the well 22 is stepped, forming a generally horizontal guide wall or surface 65 for guiding the movement of the first slide bolt 110. The well 22 also includes an interior wall 66 upstanding from the bottom 32, and extending from the first side wall 24 to the second side wall 26. The interior wall 66 provides a guide surface for movement of the second slide bolt 150. The first and second side walls 24, 26 are strengthened adjacent the first and second apertures 34, 36 by integral support ribs 67. Similarly, the latch housing bottom 43 is strengthened adjacent the first and second apertures 34, 36 by a pair of integrally molded support ribs 68 (FIG. 8).

The first and second side walls 24, 26 of the well 22 also include a pair of pivot pin mounting apertures 40 formed near the top 42 of the latch body for rotatably mounting the handle 70.

Figure 22:
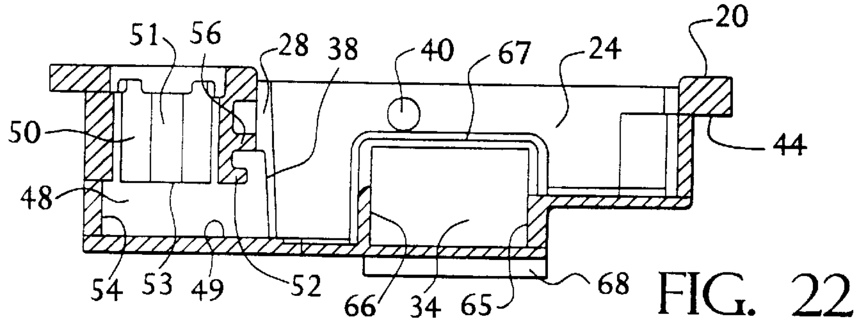
FIG. 22 is a side elevational sectional view of the latch body of FIG. 7 taken along the line 22—22.
Figure 25:
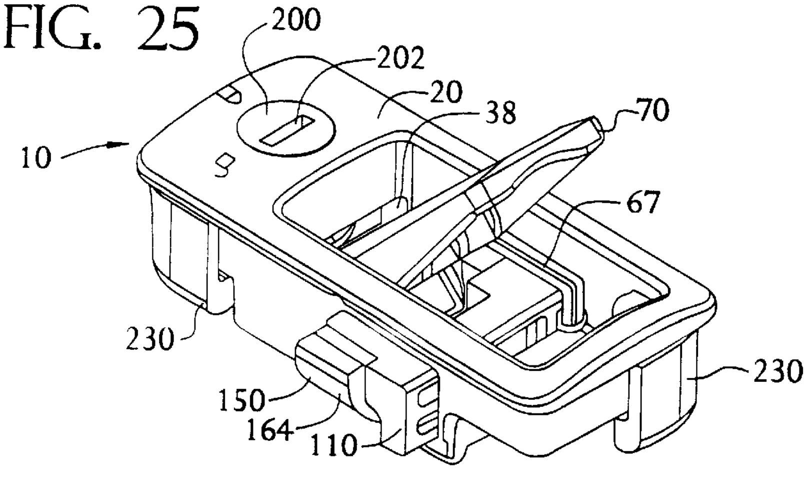
FIG. 25 is a perspective view of the slam latch of FIG. 1 showing the slam latch being operated to retract the slide bolts by lifting the handle, in order to open the slam latch.

As shown in the sectional view of FIG. 22 and the perspective view of FIG. 25, the well 22 of the latch body 20 also includes a third aperture 38 formed in the front end wall 28 thereof. In addition to the well 22, the latch body 20 also includes a lock chamber 48 for mounting and receiving the lock cylinder 200 (FIG. 1) and a lock actuator 210 (FIG. 20). As can be seen in FIG. 22, the lock chamber 48 communicates with the well 22 through the third aperture 38 formed in the front end wall 28 of the well 22.

As shown in FIG. 14, the handle or paddle 70 is gently upwardly arched to conform to the curvature of the top 42 of the latch body 20. A slight generally circular depression 90 is formed in the top 72 of the handle 70 to indicate to the operator where the handle 70 should be pressed to open the latch 10. The handle 70 includes generally parallel first and second sides 74, 76 from which extend outwardly a first and a second pivot pin 78, 80. When the latch 10 is assembled, the pivot pins 78, 80 are each inserted in a respective one of the pivot pin mounting apertures 40 formed in the first and second side walls 24, 26 of the well 22 in the latch body 20. As can be seen in FIGS. 16 and 17, a pivot bar 84 extends across the bottom 82 of the handle 70 between the first and second pivot pins 78, 80. The pivot bar 84 serves to strengthen and rigidify the handle 70 proximate the pivot pins 78, 80.

The pivot pins 78, 80 are asymmetrically positioned on the handle 70, and divide the handle 70 into a pair of lever arms 86, 88, one shorter than the other. To operate the latch 10, the shorter lever arm portion 86 of the handle 70 is pressed down by pressing on the depression 90. As the shorter lever arm 86 rotates down, the longer lever arm portion 88 of the handle 73 rotates up above the top 42 of the latch body 20. A finger can then be inserted under the longer lever arm 88 and the handle 70 can be further rotated. The lower end 89 of the handle 70 includes a gently arching recess 92 on the bottom 82 of the handle 70 so that the longer lever arm 88 can be comfortably grasped.

As best seen in FIGS. 15–17, extending from the bottom 82 of the handle 70 is a camming wedge 94 for urging the first and second slide bars 110, 150 to retract against the force of the spring means 198. The camming wedge 94 is positioned immediately adjacent the axis of rotation of the handle 70, to maximize the mechanical advantage of the first and second lever arms 86, 88. The camming wedge 94 includes a first and a second angled camming surface 96, 98 for contacting and displacing respective angled camming surfaces 148, 184 on the first and second slide bolts 110, 150 (FIGS. 9–13). As the shorter lever arm 86 of the handle 70 is rotated downwards, the camming wedge 94 extending from the bottom 82 of the handle 70 is similarly displaced downwards. As the camming wedge 94 rotates downward, the first and second angled camming surfaces 96, 98 of the camming wedge 94 contact and push outward, away from the center line of the latch body 20, a respective one of the first and second slide bolts 110, 150.

As shown in FIGS. 15–17, the handle 70 also includes a locking tab 100 extending downward from the bottom 82 of the handle 70 proximate the end of the shorter lever arm 86. When the lock cylinder 200 (FIG. 1) is in the unlocked position, the short lever arm 86 of the handle 70 can travel freely down into the well 22 until the end 102 of the locking tab 100 abuts against the internal wall 66 formed in the well 22 of the latch body 20 (FIG. 7). However, when the lock cylinder 200 (FIG. 1) is in the locked position, the lock actuator 210 is rotated to extend through the third aperture 38 (FIG. 22) and into the well 22 as describes below, and thus block downward rotation of the locking tab 100 into the well 22, preventing the slam latch 10 from being opened.

As shown in FIGS. 9–13, the first and second slide bolts 110,150 are configured to nest and support each other as they retract and extend. This is preferably accomplished by several sets of tabs and recesses formed in corresponding surfaces of the respective slide bolts 110, 150 to provide guide surfaces for motion of the slide bolts with respect to each other.

Figure 10:
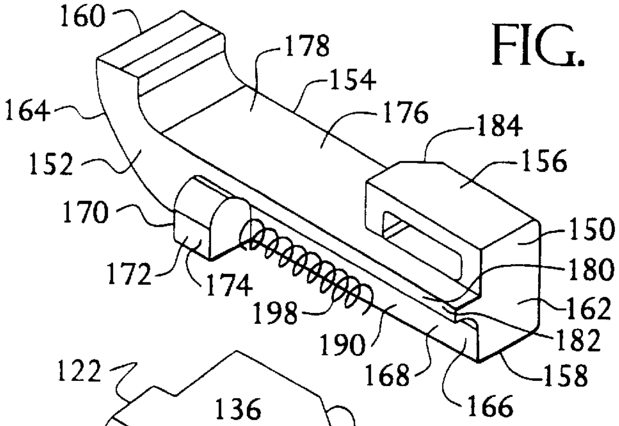
FIG. 10 is a perspective view of the second slide bolt of the slam latch of FIG. 1 showing the inner side of the second slide bolt and the spring means.
Figure 9:
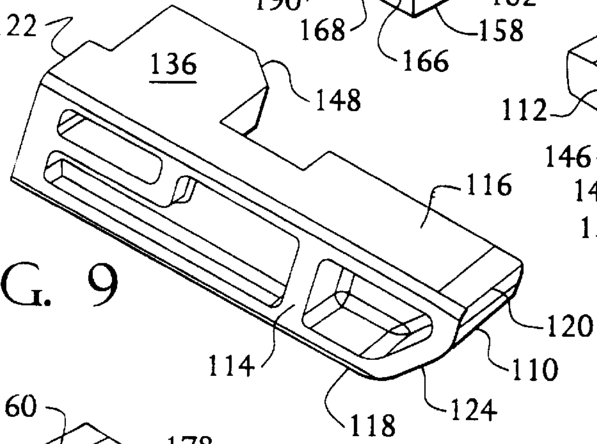
FIG. 9 is a perspective view of a first slide bolt of the slam latch of FIG. 1 showing the outer side of the first slide bolt.
Figure 11:
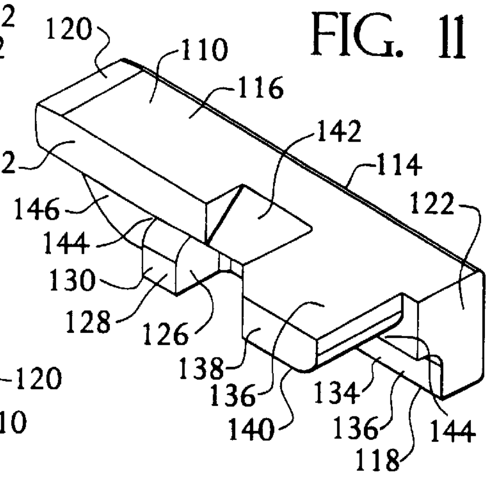
FIG. 11 is a second perspective view of the second slide bolt of FIG. 10 showing the outer side of the second slide bolt.
Figure 12:
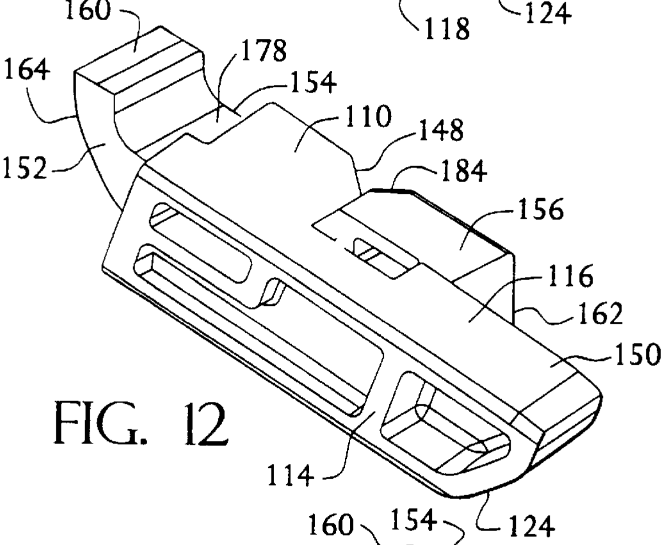
FIG. 12 is a perspective view of the slide bolts of FIGS. 9–11 showing the first and second slide bolts nesting together as installed in the slam latch of FIG. 1, the first and second slide bolts being depicted in a first or locked position.
Figure 13:
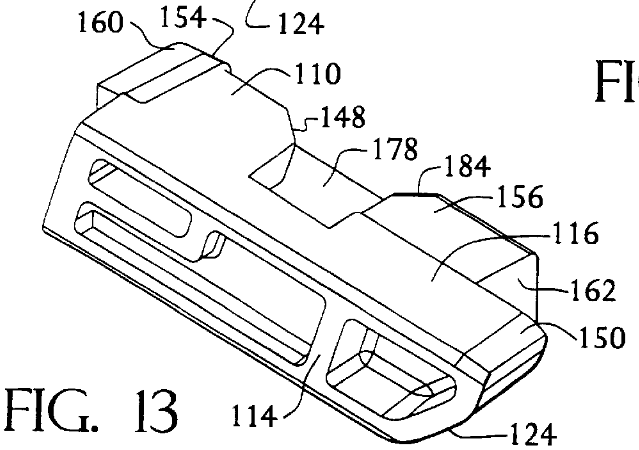
FIG. 13 is a perspective view of the slide bolts of FIG. 12 showing the first and second slide bolts in a second or unlocked position.

As shown in the perspective views of FIGS. 9 and 11, the first slide bolt 110 has an inner side 112 and an outer side 114, as well as a top 116 and a bottom 118, and a first or outer end 120, and a second or inner end 122. Similarly, the second slide bolt (FIG. 10) has an inner side 152 and an outer side 154, as well as a top 156 and a bottom 158, and an first or outer end 160, and a second or inner end 162. The first and second slide bolts 110, 150 are mounted in the latch body 20 such that the inner side 112 of the first slide bolt 110 is adjacent the inner side 152 of the second slide bolt 154, such as is shown in FIGS. 12 and 13. FIG. 12 shows the two slide bolts 110, 150 in a "normal" or extended configuration, in which the slide bolts 110, 150 are urged apart by the spring means 198 extending between the two slide bolts 110,150. FIG. 13 shows the two slide bolts 110, 150 in an "actuated" or contracted configuration, in which the spring means 198 is compressed by action of the handle 70 as it is rotated by an operator.

Each of the first and second slide bolts 100, 150 also has a respective angled camming slam surface 124, 164 formed on the respective outer ends 122, 162 thereof. When one of the slide bolts 110, 150 in the extended configuration (FIG. 12) contacts the frame 252 while the door panel 250 is being "slammed" closed, the slide bolt will be temporarily cammed back into the contracted configuration, permitting the door panel 250 to close.

The first set of nesting tabs and recesses is symmetric, in that each of the slide bolts 110, 150 is provided with an identical tab and recess. As can be seen in FIG. 11, the first slide bolt 110 includes a first tab 126 protruding from the inner side 112, and has a first guide surface 130 formed at its outer end 128 thereof; while, as can be seen in FIG. 10, the second slide bolt 150 includes a first recess 166 formed in the inner side 152, and has a first guide surface 168 formed in the recess 166. The first tab 126 of the first slide bolt 110 and the first recess 166 of the second slide bolt 150 are arranged so that the first guide surface 130 of the first slide bolt 110 lies adjacent the first guide surface 168 of the second slide bolt 150.

The first tab 126 of the first slide bolt 110 thus travels along the first recess 166 of the second slide bolt 150 when the two slide bolts 110, 150 move with respect to one another.

Symmetrically, as can be seen in FIG. 10, the second slide bolt 150 also includes a first tab 170 protruding from its inner side 152. This first tab 170 has a second guide surface 174 formed at its outer end 172. Similarly, as can be seen in FIG. 11, the first slide bolt 110 preferably also includes a first recess 132 formed in its inner side 112; and this first recess 132 has second guide surface 134 formed therein. Also similarly, the first tab 170 of the second slide bolt 150 and the first recess 132 of the first slide bolt 110 are arranged so that the second guide surface 134 of the first slide bolt 110 lies adjacent the second guide surface 174 of the second slide bolt 150, and the first tab 170 of the second slide bolt 150 travels along the first recess 132 of the first slide bolt 110 when the two slide bolts 110, 150 move with respect to one another.

The first recess 132 and first tab 130 of the first slide bolt 110 and the first recess 166 and first tab 170 of the second slide bolt 150, along with the bottom 32 of the well 22 define a chamber 190 when the two slide bolts 110, 150 are mounted in the latch body 20. In this chamber 190, the spring means 198 is preferably mounted between the first slide bolt 110 and the second slide bolt 150.

The second set of tabs and recesses are not symmetric. In this aspect, as can be seen in FIG. 11, the first slide bolt 110 includes a second tab 136 extending from the inner side 112 of the first slide bolt 110, and has a third guide surface 142 formed by one side 140 of the second tab 138. In addition, as can be seen in FIG. 10, the second slide bolt 150 has a second recess 176 formed in the top 156 thereof for receiving this second tab 136 of the first slide bolt 110. The second slide bolt 150 has a third guide surface 178 formed in the second recess 176, such that the third guide surface 142 of the first slide bolt 110 lies adjacent the third guide surface 178 of the second slide bolt 150. As can be seen in FIGS. 9, 12 and 13, the angled camming actuation surface 148 of the first slide bolt 110 is formed on the second tab 136, and as shown by FIGS. 10,12 and 13, the angled camming actuation surface 184 of the second slide bolt 150 is formed adjacent the second recess 176 of the second slide bolt 150. When the handle 70 is moved from a latched or closed position to an unlatched or open position, the first and second camming surfaces 96, 98 of the handle 70 (FIGS. 16 and 17) respectively contact the angled camming actuation surface 148 of the first slide bolt 110 formed on the second tab 136, and the angled camming actuation surface 184 of the second slide bolt 150 formed adjacent the second recess 176, to move the slide bolts 110,150 with respect to each other and retract them.

The third set of tabs and recesses is also not symmetric. As can be seen in FIG. 11, the first slide bolt 110 also includes a second recess 144 formed in the inner side 112 thereof and having a fourth guide surface 146 formed in the second recess 144. The second recess 144 extends between the first tab 126 and the second tab 136. As can be seen in FIG. 10, the second slide bolt 150 has an elongated second tab 180 formed on its inner side 152 and fourth guide surface 182 formed thereon. The second recess 144 of the first slide bolt 110 and the second tab 180 of the second slide bolt 150 are adapted such that the fourth guide surface 146 of the first slide bolt 110 lies adjacent the fourth guide surface 182 of the second slide bolt 150. The second tab 180 of the second slide bolt 150 travels along the second recess 144 of the first slide bolt 110 when the slide bolts 110, 150 move with respect to one another, thereby providing additional support. In particular, this third set of tabs and recesses opposes rotation of the slide bolts 110, 150 with respect to each other about their respective long axes.

As can be seen in FIG. 11, the first slide bar 110 also includes an angled recess 147 formed in the top 116 thereof proximate the inner side 112, to provide adequate clearance for the camming wedge 94 when the handle 70 is operated.

As can be seen in many of the views, the slide bars, the latch body, and other parts of the slam latch include apertures and recesses adapted to strengthen and rigidify the parts, while reducing the weight of the slam latch and the cost of manufacture.

In another aspect, the present invention provides an improved locking mechanism for a slam action latch. In prior art latches, the key slot for the lock cylinder is located through a hole in the handle such that the key must be removed from the lock in order for the handle to be lifted (not shown). As can be seen in FIGS. 1 and 25, the present invention provides a lock cylinder or plug 200 with a key slot 202 mounted in the latch body 20, outside perimeter of the handle 70, so that the key (not shown) may be may be left in the lock cylinder 200 for convenience while the latch 10 is being opened by operation of the handle 70. Optionally, the latch 10 can be supplied with a lock cylinder 200 which permits the key to be removed only when the latch 10 is locked, so that it is assured that the latch 10 is locked when the key is removed, as is preferred under some circumstances. Conventionally, the lock cylinder 200 is constructed so that a rotation through 90 degrees is required to lock or unlock the lock cylinder 200.

The present invention also provides an improved locking mechanism in which the provides solid blocking between the handle 70 and the surface of the latch housing 20. This provides the very good resistance to operating the latch 10 in the locked condition.

As best seen in FIGS. 7, 8 and 22, the lock chamber of the housing 20 includes an integral lock cylinder tube 50 adapted to receive the lock cylinder 200. As is conventional, the lock cylinder 200 (FIGS. 18 and 19) includes a plurality of outwardly biased pins 206 which protrude from the side of the lock cylinder 200 when the cylinder is in the locked state. The lock cylinder tube 50 includes a plurality of slots or grooves 51 (FIG. 22) formed in the interior thereof to receive the protruding pins 206 of the lock cylinder 200 in order to prevent rotation of the lock cylinder 200 when the lock cylinder is in the locked state. When the requisite key is inserted in the lock cylinder 200, the pins 204 are forced inward, flush with the exterior surface of the lock cylinder 200, so that the lock cylinder 200 can be rotated (not shown).

As best seen in FIGS. 8 and 22, the lock chamber 48 in the latch body 20 includes a front wall 54 and contains a first general horizontal wall 56 extending between the front end 28 of the well 22 to proximate the front wall 54 of the lock chamber 48 to support the lock cylinder tube 50. The first generally horizontal wall 46 terminates proximate the front wall 54 of the lock chamber 56 in a generally vertical wall 58 which is normal to the long axis of the latch body 20. The vertical wall 58 extends down from the top 42 of the latch body 20 to a second generally horizontal wall 60, which is spaced from the generally planar bottom 49 of the lock chamber 48. The bottom 53 of the lock cylinder tube 50 is also spaced from and generally parallel to the bottom 49 of the lock chamber 48. A flange 52 extends outwardly from the lock cylinder tube 50 proximate the bottom 53 thereof. An aperture 62 is formed in the latch housing 20 to permit access to the lock chamber 48 for installation of the lock actuator 210 (FIGS. 20, 23).

As best seen in FIG. 20, the lock actuator 210 includes a cap 212 and an arm 216 extending radially outwardly from the side of the cap 212. The arm 216 includes a first generally horizontal section 218 and a second generally vertical section 220 extending upward from one end of the first section 218. A guide tab 222 is formed on the inside of the second section 220 of the arm 216. The guide tab 222 is generally parallel to and spaced from the horizontally extending first section 218 of the arm 216.

As best seen in FIGS. 18 and 19, the lock cylinder 200 includes a pair of prongs 204 extending downward at the bottom thereof. The cap 212 (FIG. 20) of the lock actuator 210 has a pair of recesses 214 formed in therein and sized and positioned to receive the prongs 204 of the lock cylinder 200 when the latch 10 is assembled. The cap 212 also includes a peripheral groove 213 formed on the interior of the cap 212 proximate the top edge thereof.

In assembling the slam latch 10, the lock actuator 210 is placed through the access aperture 62 into the lock chamber 48 (FIGS. 23 and 8), the cap 212 being aligned with the lock cylinder tube 50. The cap 212 is sized to fit in the space under the lock cylinder tube 50. When the cap 212 is aligned with the lock cylinder tube 50, the guide tab 222 on the lock actuator 210 extending above the flange 52 formed on the bottom of the lock cylinder tube 50, and the first section 218 of the arm 216 extends below the flange 52.

Prior to assembly of the slam latch 10, the lock cylinder 200 is fitted with a spring clip 208 (FIG. 18) in a groove 209 formed normal to the axis of the lock cylinder 200 on the exterior thereof. The locking mechanism for the slam latch 10 is assembled by pressing the lock cylinder 200 down into the lock cylinder tube 50, thereby temporarily compressing the spring clip 208. The groove 209 is positioned so that when the lock cylinder 200 is fully seated in the lock cylinder tube 50, the spring clip 208 emerges from the lock cylinder tube 50 and expands, securing the lock cylinder 200 in the latch 10, and preventing subsequent withdrawal of the lock cylinder 200 from the tube 50. When the lock cylinder is fully seated in the lock cylinder tube 50, the prongs of the lock cylinder 200 extend into the recesses 214 formed in the cap 212 of the lock actuator 210, and the spring clip 208 expands into the peripheral groove 213 formed on the interior of the cap 212. Thus, when the lock cylinder 200 is rotated, the lock actuator 210 is caused to rotate therewith. Further, because the expanded spring clip 208 is contained within the cap 212, it is not accessible from the access aperture 62 or otherwise, and the locking mechanism cannot be easily disassembled by unauthorized personnel. When the lock cylinder 200 is rotated through 90 degrees to unlock the lock cylinder 200, the lock actuator 210 is also rotated through the same angle. As the lock is unlocked, the arm 215 of the lock actuator 210 is rotated from a position inside the lock chamber 48, through the third aperture 38 in the front wall 38 of the well 22, and into the well 22, to a position wherein the second section 222 of the arm 216 is immediately under the lower end 102 of the locking tab 100 of the handle 70, thus preventing downward movement of the handle 70 to prevent the latch 10 from being opened.

Figure 21:
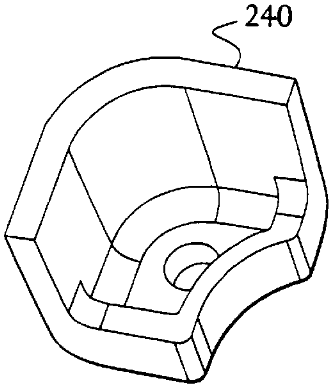
FIG. 21 is a perspective view of a mounting clip of the slam latch of FIG. 1.
Figure 24:
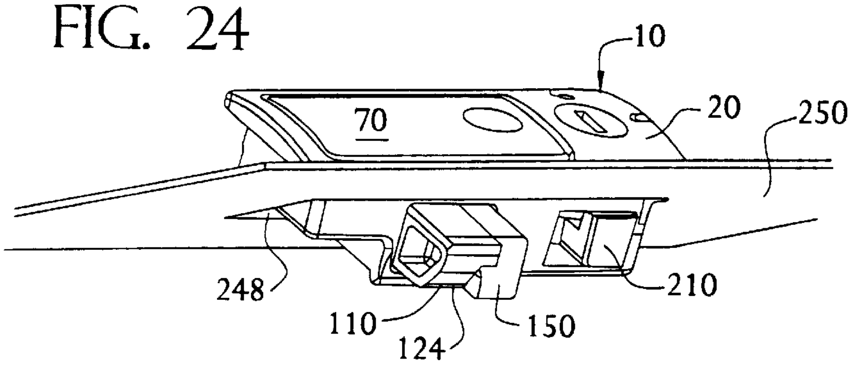
FIG. 24 is a perspective view of the slam latch of FIG. 1 showing the latch in the process of being mounted in the door panel of FIG. 5.

As shown in the perspective view of FIG. 24, to install the latch 10 of the present invention in a suitably sized generally rectangular opening 248 in a door panel 250, one of the slide bolts 110, 150 is fully retracted while the other remains in the extended position, the side of the latch 10 with the extended is inserted into the opening 248, and latch 10 is then rotated or "rocked" downward onto the panel 250 (not shown) until flush and the previously retracted slide bolt is permitted to return to the extended configuration. The slam latch 10 is provided with a pair of mounting clips 230, best seen in FIG. 21, each mounting clip 230 including a bottom 232 and an upstanding two sided wall 234, the bottom 232 including an aperture 236 sized to receive a self-tapping screw. As shown in FIGS. 1, 4, and 10, the latch body 20 is adapted to receive the mounting clips 230 at opposite comers of the latch body 20, with screw-receiving apertures (not shown) being formed in the bottom of the latch body 20 proximate opposite comers thereof. After the latch 10 is positioned in the panel opening 248, the mounting clips 230 are affixed to the latch body 20 using self-tapping screws (FIGS. 1, 3, 4, and 23), such that the walls 234 of the mounting clips 230 abut against the underside of the panel door 250, the door panel being securely gripped between the mounting clips 230 and the underside of the flange 44 of the latch body 20. The mounting clips 230 are preferably formed from a stiff plastic material, such as glass-reinforced nylon.

To operate the latch 10, the operator first unlocks the lock cylinder 200, and then simply places a finger on the depression 90 in the handle 70 and pushes. The other end of the handle 70 swings upward, and the end can be grasped to permit the operator to swing the handle 70 further upward and outward. In so doing, the operator retracts the slide bars 110,150 and also incidentally swings the door panel 250 open. When the door panel is slammed closed, contact with the edge of the frame caused one of the slide bars 110, 150 to retract, permitting the door panel 250 to fully close, whereupon the same slide bar springs outward, and under the frame 252, thereby latching the door panel 250 to the frame 252.

Various other modifications can be made in the details of the various embodiments of the apparatus of the present invention, all within the scope and spirit of the invention and defined by the appended claims.

We claim:

1. A latch of the sliding-action slam type for installation in an opening in a door panel for releasably retaining the door panel relative to a frame, the latch comprising;

a) a latch body having a pair of opposed apertures;

b) a handle rotatably mounted on the latch body, the handle having a first camming surface and a second camming surface, the handle being rotatable about a first axis between a closed position and an open position;

c) a first slide bolt and a second slide bolt, the first slide bolt and the second slide bolt being mounted in the latch body for travel parallel the first axis through the opposed apertures, the first slide bolt having a camming surface for engagement with the first camming surface of the handle, the second slide bolt having a camming surface for engagement with the second camming surface of the handle, the handle and the two slide bolts being mounted in the latch body such that the first slide bolt is cammed inwardly by the first camming surface of the handle through one of the opposed apertures in the latch body while the second slide bolt is being cammed by the second camming surface of the handle inwardly through the other of the opposed apertures in the latch body, when the handle is rotated from the closed position to the open position.

2. A slam latch according to claim 1 further comprising spring means for biasing the first slide bolt and the second slide bolt outwards.

3. A slam latch according to claim 2 wherein the first slide bolt has an inner side and an outer side, the second slide bolt having an inner side and an outer side, the slide bolts being mounted in the latch body such that the inner side of the first slide bolt is adjacent the inner side of the second slide bolt.

4. A slam latch according to claim 3 wherein the first slide bolt includes a first tab having an outer end, the first tab protruding from the inner side of the first slide bolt and having a first guide surface formed at the outer end, the second slide bolt including a first recess formed in the inner side of the second slide bolt and having a first guide surface formed therein, the first tab of the first slide bolt and the first recess of the second slide bolt being adapted such that the first guide surface of the first slide bolt lies adjacent the first guide surface of the second slide bolt.

5. A slam latch according to claim 4 wherein the second slide bolt includes a first tab having an outer end, the first tab protruding from the inner side of the second slide bolt and having a second guide surface formed at the outer end, the first bolt including a first recess formed in the inner side of the first slide bolt and having a second guide surface formed therein, the first tab of the second slide bolt and the first recess of the first slide bolt being adapted such that the second guide surface of the second slide bolt lies adjacent the second guide surface of the first slide bolt.

6. A slam latch according to claim 5 wherein the first recess and first tab of the first slide bolt and the first recess and first tab of the second slide bolt define a chamber, the spring means being mounted in the chamber between the first slide bolt and the second slide bolt.

7. A slam latch according to claim 5 wherein the first slide bolt includes a second tab extending from the inner side of the first slide bolt and having a third guide surface formed by one side of the second tab, the second slide bolt having a second recess formed in the top of the second slide bolt for receiving the second tab of the first slide bolt and having a third guide surface formed in the second recess, the third guide surface of the first slide bolt lying adjacent the third guide surface of the second slide bolt.

8. A slam latch according to claim 7 wherein the camming surface of the first slide bolt is formed on the second tab, the camming surface of the second slide bolt being formed adjacent the second recess of the second slide bolt.

9. A slam latch according to claim 7 wherein the first slide bolt includes a second recess formed in the inner side of the first slide bolt and having a fourth guide surface formed in the second recess, the second slide bolt having a second tab formed on the inner side of the second slide bolt and having a fourth guide surface formed at the end thereof, the second recess of the first slide bolt and the second tab of the second slide bolt being adapted such that the fourth guide surface of the first slide bolt lies adjacent the fourth guide surface of the second slide bolt.

10. A latch of the sliding-action slam type for installation in an opening in a door panel for releasably retaining the door panel relative to a frame, the latch comprising;

a) a latch body having a pair of opposed apertures;

b) a handle rotatably mounted on the latch body, the handle having a first camming surface and a second camming surface, the handle being rotatable about a first axis between a closed position and an open position;

c) a first slide bolt and a second slide bolt, the first slide bolt and the second slide bolt being mounted in the latch body for travel parallel the first axis through the opposed apertures, the first slide bolt having a camming surface for engagement with the first camming surface of the handle, the second slide bolt having a camming surface for engagement with the second camming surface of the handle, the handle and the two slide bolts being mounted in the latch body such that the first slide bolt is cammed inwardly by the first camming surface of the handle through one of the opposed apertures in the latch body while the second slide bolt is being cammed by the second camming surface of the handle inwardly through the other of the opposed apertures in the latch body, when the handle is rotated from the closed position to the open position;

d) spring means for biasing the first slide bolt and the second slide bolt outwards;

e) a lock cylinder adapted for rotation between a locked position and an unlocked position;

f) a lock actuator mounted for rotation with the lock cylinder, the lock actuator being adapted to prevent rotation of the handle when the lock is in the closed position.

11. A latch according to claim 10 wherein the lock actuator includes an arm, the handle having a first end and second end and a pivot axis intermediate the first end and the second end, the handle being adapted to rotate from a closed position to an open position by being pressed intermediate the first end and the pivot axis, the arm rotating as the lock cylinder is rotated between an open position and a closed position, the arm being positioned beneath the handle intermediate the first end and the pivot axis when the lock cylinder in the closed position to prevent rotation of the handle.

12. A slam latch according to claim 10 wherein the first slide bolt has an inner side and an outer side, the second slide bolt having an inner side and an outer side, the slide bolts being mounted in the latch body such that the inner side of the first slide bolt is adjacent the inner side of the second slide bolt.

13. A slam latch according to claim 12 wherein the first slide bolt includes a first tab having an outer end, the first tab protruding from the inner side of the first slide bolt and having a first guide surface formed at the outer end, the second slide bolt including a first recess formed in the inner side of the second slide bolt and having a first guide surface formed therein, the first tab of the first slide bolt and the first recess of the second slide bolt being adapted such that the first guide surface of the first slide bolt lies adjacent the first guide surface of the second slide bolt.

14. A slam latch according to claim 13 wherein the second slide bolt includes a first tab having an outer end, the first tab protruding from the inner side of the second slide bolt and having a second guide surface formed at the outer end, the first bolt including a first recess formed in the inner side of the first slide bolt and having a second guide surface formed therein, the first tab of the second slide bolt and the first recess of the first slide bolt being adapted such that the second guide surface of the second slide bolt lies adjacent the second guide surface of the first slide bolt.

15. A slam latch according to claim 14 wherein the first recess and first tab of the first slide bolt and the first recess and first tab of the second slide bolt define a chamber, the spring means being mounted in the chamber between the first slide bolt and the second slide bolt.

16. A slam latch according to claim 14 wherein the first slide bolt includes a second tab extending from the inner side of the first slide bolt and having a third guide surface formed by one side of the second tab, the second slide bolt having a second recess formed in the top of the second slide bolt for receiving the second tab of the first slide bolt and having a third guide surface formed in the second recess, the third guide surface of the first slide bolt lying adjacent the third guide surface of the second slide bolt.

17. A slam latch according to claim 16 wherein the camming surface of the first slide bolt is formed on the second tab, the camming surface of the second slide bolt being formed adjacent the second recess of the second slide bolt.

18. A slam latch according to claim 16 wherein the first slide bolt includes a second recess formed in the inner side of the first slide bolt and having a fourth guide surface formed in the second recess, the second slide bolt having a second tab formed on the inner side of the second slide bolt and having a fourth guide surface formed at the end thereof, the second recess of the first slide bolt and the second tab of the second slide bolt being adapted such that the fourth guide surface of the first slide bolt lies adjacent the fourth guide surface of the second slide bolt.

* * * * *